(12) United States Patent
Gutierrez et al.

(10) Patent No.: US 9,596,880 B2
(45) Date of Patent: Mar. 21, 2017

(54) FLAVORING DISPENSER FOR DRESSING A BEVERAGE BOTTLE NECK

(71) Applicant: FAB & LOS Enterprises, LLC, McAllen, TX (US)

(72) Inventors: Carlos Gutierrez, McAllen, TX (US); Fabian Hernandez, McAllen, TX (US)

(*) Notice: Subject to any disclaimer, the term of this patent is extended or adjusted under 35 U.S.C. 154(b) by 81 days.

(21) Appl. No.: 14/468,393

(22) Filed: Aug. 26, 2014

(65) Prior Publication Data

US 2016/0044953 A1    Feb. 18, 2016

Related U.S. Application Data

(63) Continuation-in-part of application No. 14/461,230, filed on Aug. 15, 2014.

(51) Int. Cl.
| | | |
|---|---|---|
| A23P 1/00 | (2006.01) | |
| A23L 2/56 | (2006.01) | |
| A47J 43/27 | (2006.01) | |
| A23P 10/10 | (2016.01) | |
| A23L 27/00 | (2016.01) | |
| B05C 3/20 | (2006.01) | |
| B05C 19/00 | (2006.01) | |

(52) U.S. Cl.
CPC ............. *A23P 1/005* (2013.01); *A23L 2/56* (2013.01); *A23L 27/00* (2016.08); *A23P 10/10* (2016.08); *A47J 43/27* (2013.01); *A23V 2002/00* (2013.01); *B05C 3/20* (2013.01); *B05C 19/00* (2013.01)

(58) Field of Classification Search
CPC .................................................. A23V 2002/00
USPC ........... 118/13, 24, 26; 220/735, 751, 254.3, 220/254.1; 426/115, 120, 590
See application file for complete search history.

(56) References Cited

U.S. PATENT DOCUMENTS

| | | | |
|---|---|---|---|
| 2,753,051 A | 7/1956 | Tupper | |
| 3,434,859 A | 3/1969 | Benjamin | |
| 6,951,212 B1 | 10/2005 | Ho et al. | |
| 7,328,670 B2 | 2/2008 | Puentes-Barr | |
| 8,158,052 B2 | 4/2012 | Richards et al. | |
| 8,365,960 B1* | 2/2013 | Kalaouze | B65D 81/3211 206/221 |
| 8,522,968 B2 | 9/2013 | Middleman et al. | |
| 8,550,379 B2 | 10/2013 | Spangler | |
| 2004/0050815 A1* | 3/2004 | Blanchester | B65D 23/104 215/399 |
| 2007/0295319 A1 | 12/2007 | Carter et al. | |
| 2008/0072433 A1 | 3/2008 | Ohring et al. | |
| 2008/0076321 A1 | 3/2008 | Voltz et al. | |

(Continued)

OTHER PUBLICATIONS

Alibaba.com, 100 Round Paintball Pod, J. Arthur Ltd, 2 pages, retrieved Nov. 3, 2014, <http://www.alibaba.com/product-detail/100-round-paintball-pod_131427767.html>.

*Primary Examiner* — Laura Edwards
(74) *Attorney, Agent, or Firm* — Peter V. Schroeder; Booth Albanesi Schroeder LLC

(57) ABSTRACT

A dispenser for delivering a pourable, edible substance, such as salt, to the exterior surface of a bottle neck provides a body with a closed end and an open end. An interior compartment contains the pourable substance. The closed end has a planar exterior surface for securely positioning the dispenser on a horizontal surface such as a countertop. The open end has a mouth sized to receive the beverage bottle neck. A movable cap is attached to the body or a removable closure assembly.

17 Claims, 2 Drawing Sheets

(56) References Cited

U.S. PATENT DOCUMENTS

2008/0245293 A1    10/2008   Fosmire et al.
2011/0278184 A1*   11/2011   Middleman ............ A47G 21/00
                                                                                                                                                  206/222
2013/0139703 A1     6/2013   Hogarth

* cited by examiner

FLAVORING DISPENSER FOR DRESSING A BEVERAGE BOTTLE NECK

CROSS-REFERENCE

This Application is a Continuation in Part of U.S. patent application Ser. No. 14/461,230 filed Aug. 15, 2014 now abandoned, which is hereby incorporated by reference.

FIELD OF INVENTION

The present invention is in the field of food service products and more particularly to devices for dressing the exterior of beverage containers.

BRIEF DESCRIPTION OF THE DRAWING

For a more complete understanding of the features and advantages of the present invention, reference is now made to the detailed description of the invention along with the accompanying figures in which corresponding numerals in the different figures refer to corresponding parts and in which.

DETAILED DESCRIPTION

Figure 1:
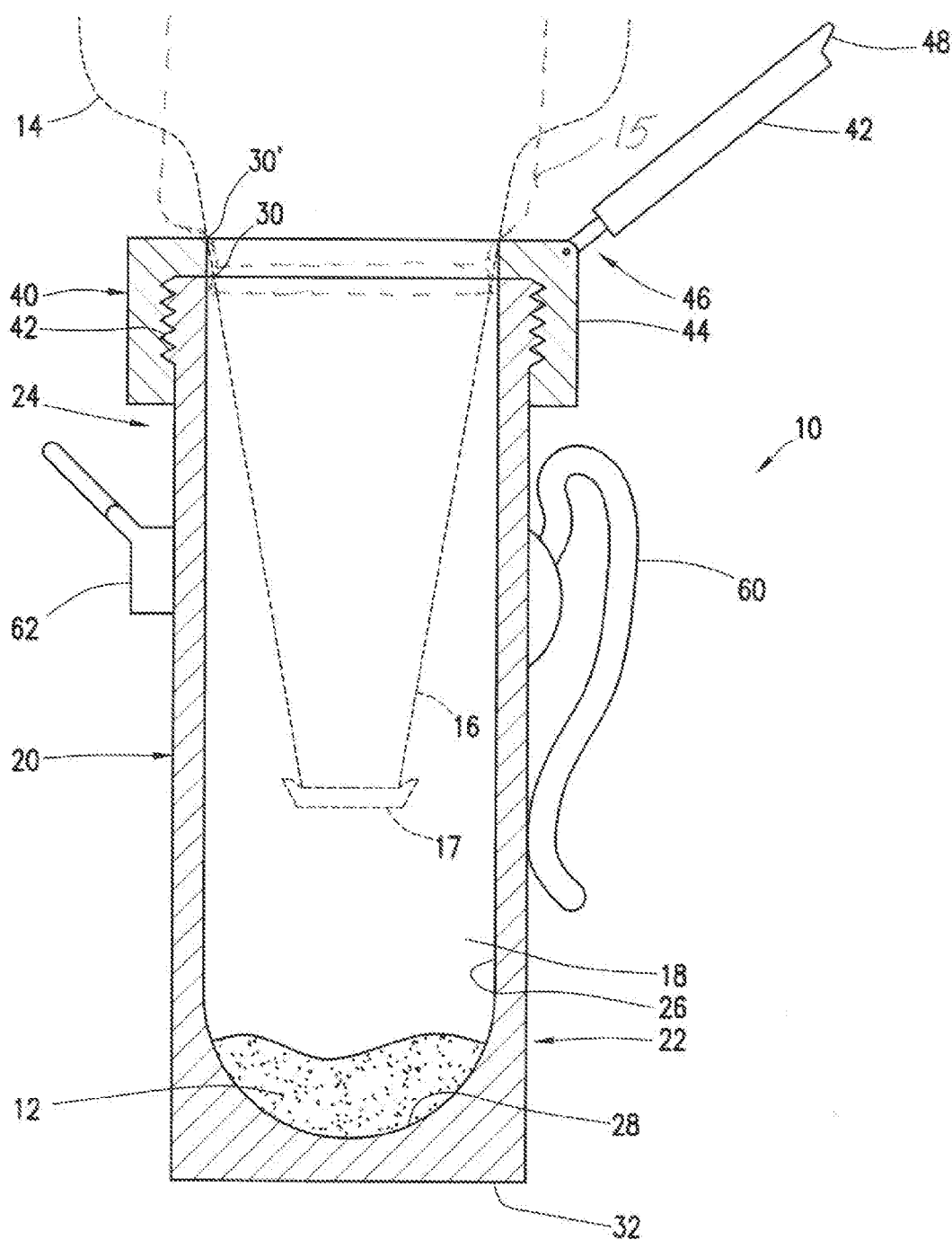
FIG. 1 is an elevational view in cross-section of an exemplary dispenser according to an aspect of the disclosure.

The present inventions and disclosures are described by reference to drawings showing one or more examples of how the inventions can be made and used. In these drawings, reference characters are used throughout the several views to indicate like or corresponding parts. In the description which follows, like or corresponding parts are marked throughout the specification and drawings with the same reference numerals, respectively. The drawings are not to scale and proportions of certain parts have been exaggerated to better illustrate details and features.

FIG. 1 is an elevation side view in cross-section of an exemplary dispenser according to an aspect of the invention. A dispenser, generally designated 10, for delivering a pourable, edible substance 12 to the exterior surface of a beverage bottle, in dashed lines, is illustrated. A beverage bottle 14 having an elongated neck 16 and a sealed bottle cap 17 is shown positioned with the neck positioned into the interior compartment 18 defined by the dispenser 10. A pourable, edible substance 12 is positioned in the interior compartment as well.

The interior compartment 18 is elongated to allow insertion of a typical, commercially available, beverage bottle neck, including, in an exemplary embodiment both regular and long-neck bottles. The beverage bottles can be made of glass, colored glass, aluminum, steel, plastic or other material. The interior compartment is bounded by solid walls to contain the pourable substance and preferably fits tightly enough to maintain the pourable substance dry. The overall length of the dispenser can be in the range of between about 17 to 30 cm. The open end 24 defines a circular mouth 30. The mouth 30 provides a tight or flush fit, without undue application of force by the user, against a bottle neck. In one embodiment, the mouth is between 5.1 and 5.7 cm. In another embodiment, the mouth is between 5.4 cm and 6.8 cm. In one embodiment the mouth diameter is approximately 5.45 cm. In some embodiments, the dispenser can also "dress," or apply a pourable substance to, both bottles and standard beverage cans. For example, in a preferred embodiment, the mouth opening diameter is between the end diameter and body diameter of a standard aluminum can, as indicated in FIG. 1 by dashed line 15. Standard can sizes and dimensions vary in different world regions. Standard cans in common use in North America come in eight, twelve and sixteen ounce sizes, for example. Standard body diameters for a twelve ounce can are about 6.6 cm (or 6.8 cm on some cans) and about standard end diameters are about 5.4 cm. In South America a standard twelve ounce can has a body diameter of approximately 6.6 cm and an end diameter of approximately 5.9 cm. European and Russian cans are typically in 250, 330, 440, and 500 ml sizes with an end diameter of 52 mm and a body diameter of 66.2 to 66.3 mm.

At the upper end 24 of the body 20 is a closure assembly 40 having, in one embodiment, a base portion 44 and a cap 42. The closure assembly 40 is preferably detachable, or removably attachable, by hand, to the upper end of the dispenser body 20. The attachment mechanism 42 of the closure assembly 40 can take various forms, such as friction fit, mating threads (internal or external to the dispenser body), snap-on connections, safety cap connection, etc. In the preferred embodiment seen in FIG. 1, the attachment mechanism comprises mating threads. The threads can be machined, molded, or otherwise created, can be acme or regular threads, and can be metal, plastic or other material. The closure assembly 40 depicted has an outer diameter greater than that of the body 20. In an alternate embodiment, the exterior surfaces of the body and closure assembly can be flush, having the same outer diameter.

Further, the closure assembly 40 shown has an opening 41 therethrough concentric with and of the same inner diameter as the mouth 30 of the dispenser body 20. Where such a closure assembly is used, the effective mouth for the assembled dispenser and closure assembly is closure assembly mouth 30'. In such a case, the closure mouth 30' performs the same functions as described herein for the dispenser body mouth 30.

The cap 42 is movably attached to the closure assembly base portion 44 and is movable with respect to the dispenser body 20, particularly the mouth 30. The cap is movable by hand between a fully open position, in which a bottle neck or pourable substance can be inserted into the interior compartment 18, and a closed position in which the cap covers the mouth 30 of the dispenser body 20. In the open position, the interior compartment can be used, rinsed or washed. In the closed position, a pourable substance can be stored securely in the interior compartment 18. The cap 42 provides a press-fit upon application of slight hand-pressure to ensure the cap stays closed. Alternately, the cap 42 can be secured to the base 44 by a latch, clasp, etc.

The cap 42 seen in FIG. 1 is pivotally attached to the closure assembly base 40 at a pivot 46. The pivot can be a simple plastic tab extending between the cap and base, a hinge, a hinge having a transverse pivot pin, etc. Alternately, the cap can be removably attached to the base and secured to the base by a string, chain, etc. The cap can include a tab 48 for easing opening and closing of the cap.

In another embodiment, a movable or removable cap is attached to the dispenser body directly, without the need for a separate closure assembly.

Figure 2:
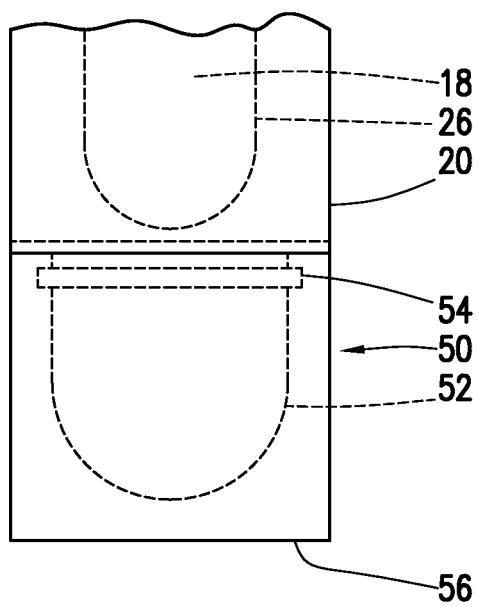
FIG. 2 is a partial elevation view of an embodiment of the dispenser according to an aspect of the disclosure.

FIG. 2 is a partial elevation view of an embodiment of the dispenser according to an aspect of the disclosure. An exemplary embodiment includes a storage unit 50 attached or attachable to the lower end 22 of the dispenser body 20. Such a storage unit 50 can be removably attachable to the body such as by friction fit, mating threads, etc., or other attachment mechanism 54. Alternately, the storage unit can be monolithic with or permanently attached to the body 20. An inner compartment 52 of the storage unit provides a space for storage of small items, for example, lime slices or spare pourable substance. Where the storage unit is provided, the exterior bottom surface 56 of the unit is preferably planar, allowing stable positioning of the dispenser, with the unit attached, on a flat surface. Preferably the storage unit has exterior dimensions corresponding to those of the dispenser body (e.g., outer diameter).

Figure 3:
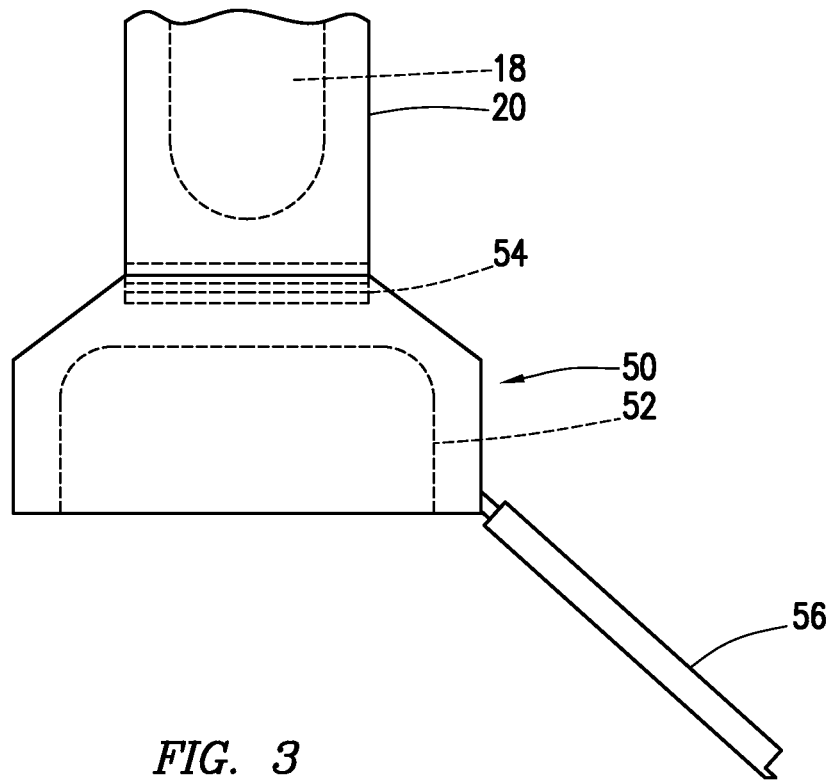
FIG. 3 is a partial elevation view of an embodiment of the dispenser according to an aspect of the disclosure.

FIG. 3 is a partial elevation view of an embodiment of the dispenser according to an aspect of the disclosure. Alternately, the storage unit 50 can be of different dimensions or shape than the dispenser body 20. In the example seen in FIG. 3, the storage unit has an enlarged outer diameter portion 53 providing a larger bottom surface 56 for stable placement of the dispenser on a flat surface. An alternate storage unit has an outer diameter and shape sized to snugly fit into a bottle compartment of a typical six-pack package, a cup holder, etc. Alternately, an enlarged outer diameter portion of the lower end 22 of the dispenser body 20 can be provided, with or without the storage unit capacity.

The storage unit compartment 52 has an open end 58, which can be positioned at the upper or lower end of the storage unit. In FIG. 2, the compartment 52 has an upwardly facing open end 58; in FIG. 3 the compartment 52 has a downwardly facing open end 58.

Further, the storage unit 50 can include a storage cap 70, as seen in FIG. 3. Such a cap can take various forms, as discussed above with reference to dispenser cap 42, can be removable, attached via pivot or otherwise, press-fit, etc. The movable storage cap 70 is shown in an open position in FIG. 3 and positioned at the lower end of the unit 50. Alternately, the storage cap 70 can be positioned at the storage unit side surface, upper end, etc. Where the storage cap 70 is at the lower end of the unit, note that the outer surface 72 of the storage cap 70, when closed, serves as the planar surface 56 for positioning the dispenser assembly on a flat surface.

An exterior connector 60 is positioned, permanently or removably, to the dispenser 20. The exemplary connector 60 shown is a belt clip, however, the connector can alternately or also be a key chain loop, a loop sized to hang the dispenser from a hook or bottle neck, a magnetic or adhesive connector for attachment to a cooperating surface (such as a magnetic refrigerator surface).

A bottle opener 62 is positioned on the dispenser, preferably the dispenser body 20. The bottle opener can be positioned on any exterior surface of the dispenser or storage unit.

The dispenser, or a plurality of dispensers, can be collected into a kit, the kit comprising one or more of the following: dispenser body, closure assembly, exterior connector, bottle opener, pourable substances, and/or storage unit.

For washing, the storage unit and/or closure assembly are removable. All elements of the dispenser are preferably washable, dish-washer safe, and refrigerator safe.

A device is presented for applying salt or other flavoring to the exterior of a bottle neck (sometimes called "rimming"). The device can be of plastic, polypropylene, or other food-safe (e.g., PBA free) material. The device has a tubular body having a hinged-top, screw-top, snap-top, etc., and/or a closure at an open end of the body. The tube exterior shape includes a flat base surface at a closed end of the body. In some embodiments, an exterior connector or bottle cap opener is positioned on the exterior of the body.

The dispenser is used to apply salt or other pourable edible substance to a beverage bottle after application of lemon or lime juice (or any other edible liquid substance to which the pourable substance will stick) to the neck of an unopened bottle. A pourable substance is placed in the interior compartment of the dispenser. The bottle is turned upside down and placed inside the interior compartment. If necessary, a movable cap is removed from the dispenser mouth prior to insertion of the bottle neck. The bottle is inserted as deeply as possible, such that the bottle exterior is flush with the dispenser mouth. Both the dispenser and the bottle, in unison and remaining in contact, are flipped over allowing the pourable substance to fall over and stick to the wetted portion of the bottle neck. The dispenser and bottle are flipped to an upright position, and the bottle neck is removed from the dispenser. The cap can be moved to a closed position to provide for storage of remaining or added pourable substance.

The disclosure is provided in support of any methods claimed or which may be later claimed. Specifically, support is provided to meet the technical, procedural, or substantive requirements of certain examining offices. It is expressly understood that the portions or actions of the methods can be performed in any order, unless specified or otherwise necessary, that each portion of the method can be repeated, performed in orders other than those presented, that additional actions can be performed between the enumerated actions, and that, unless stated otherwise, actions can be omitted or moved. Those of skill in the art will recognize the various possible combinations and permutations of actions performable in the methods disclosed herein without an explicit listing of every possible such combination or permutation. It is explicitly disclosed and understood that the actions disclosed can be performed in any order (xyz, xzy, yxz, yzx, etc.) without the wasteful and tedious inclusion of writing out every such order.

The words or terms used herein have their plain, ordinary meaning in the field of this disclosure, except to the extent explicitly and clearly defined in this disclosure or unless the specific context otherwise requires a different meaning.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

As used herein, the words "consisting essentially of," and all grammatical variations thereof, are intended to limit the scope of a claim to the specified materials or steps and those that do not materially affect the basic and novel characteristic(s) of the claimed disclosure.

The indefinite articles "a" or "an" mean one or more than one of the component, part, or step that the article introduces. The terms "and," "or," and "and/or" shall be read in the least restrictive sense possible. Each numerical value should be read once as modified by the term "about" (unless already expressly so modified), and then read again as not so modified, unless otherwise indicated in context.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

While the foregoing written description of the disclosure enables one of ordinary skill to make and use the embodiments discussed, those of ordinary skill will understand and appreciate the existence of variations, combinations, and equivalents of the specific embodiments, methods, and examples herein. The invention should therefore not be limited by the above described embodiments, methods, and examples. While this disclosure has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments. The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure. The various elements or steps according to the disclosed elements or steps can be combined advantageously or practiced together in various combinations or sub-combinations of elements or sequences of steps to increase the efficiency and benefits that can be obtained from the disclosure. It will be appreciated that one or more of the above embodiments may be combined with one or more of the other embodiments, unless explicitly stated otherwise. The disclosure illustratively disclosed herein suitably may be practiced in the absence of any element or step that is not specifically disclosed or claimed. Furthermore, no limitations are intended to the details of construction, composition, design, or steps herein shown, other than as described in the claims.

It is claimed:

1. A dispenser for delivering a solid, pourable, edible substance, such as salt, to the exterior surface of a sealed bottle or can containing a beverage, the dispenser comprising:
   a tubular body having a closed end, an open end, and defining an interior compartment for containing the solid, pourable, edible substance, wherein:
      the closed end defines a generally planar exterior surface for securely positioning the dispenser on a horizontal surface;
      the open end defines a generally circular dispenser mouth sized to receive the neck of a sealed beverage bottle positioned upside down or the dispensing end of a sealed beverage can positioned upside down and flush against the dispenser mouth;
      the interior compartment defines an end wall adjoining a generally cylindrical side wall, the side wall terminating at the dispenser mouth, the interior compartment sized to receive at least a portion of the bottle neck or can end, the dispenser mouth, when held flush against the bottle neck or can end, holding the pourable substance within the interior compartment when the dispenser and bottle or can are turned over such that the bottle or can is right side up, and wherein the pourable substance is delivered to the exterior surface of the bottle neck or can end;
   a dispenser closure assembly removably attached to the tubular body and having a cap movable between a closed position, wherein the cap closes the dispenser mouth, and an open position, allowing insertion of the bottle neck of an upside down bottle or the can end of an upside down can into the interior compartment.

2. The dispenser of claim 1, wherein the cap is mounted for movement relative to the tubular body or a closure assembly base.

3. The dispenser of claim 2, wherein the cap is pivotally mounted.

4. The dispenser of claim 2, wherein the closure assembly is removably attached to the tubular body by mating screw threads, friction fit, interference fit, snap-on attachment, or a combination of these.

5. The dispenser of claim 4, wherein the closure assembly contacts only the exterior of the tubular body.

6. The dispenser of claim 3, wherein the cap is movable about a laterally extending hinge between the open and closed positions.

7. The dispenser of claim 1, wherein the cap, when in the closed position, detachably secures to the tubular body or closure assembly base by friction fit, interference fit, latch, snap-on attachment, or a combination thereof.

8. The dispenser of claim 6, wherein the hinge is positioned exterior to a cylinder defined by the interior side wall of the tubular body.

9. The dispenser of claim 8, wherein the cap moves about the hinge to the open position, in which the cap is entirely exterior to the cylinder defined by the interior side wall of the tubular body.

10. The dispenser of claim 1, further comprising a waist belt clip mounted on the tubular body.

11. The dispenser of claim 1, further comprising a bottle cap opener mounted on the tubular body.

12. The dispenser of claim 1, wherein a mouth diameter is between 5.1 and 5.7 cm.

13. The dispenser of claim 1, wherein a mouth diameter is between 5.4 and 6.8 cm.

14. The dispenser of claim 1, wherein a mouth diameter is approximately 5.45 cm.

15. The dispenser of claim 1, wherein a mouth diameter is between 5.4 and 6.6 cm.

16. The dispenser of claim 1, wherein a mouth diameter is between 5.1 and 5.7 cm.

17. The dispenser of claim 1, wherein a mouth diameter is between 2.5 and 5.5 cm.

* * * * *